United States Patent
Sato et al.

(10) Patent No.: US 8,562,475 B2
(45) Date of Patent: Oct. 22, 2013

(54) ECCENTRIC ROCKING TYPE REDUCTION GEAR

(75) Inventors: Hisataka Sato, Toyota (JP); Yoshinobu Katoh, Toyohashi (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/878,605

(22) PCT Filed: Dec. 2, 2011

(86) PCT No.: PCT/JP2011/077921
§ 371 (c)(1),
(2), (4) Date: Apr. 10, 2013

(87) PCT Pub. No.: WO2012/074096
PCT Pub. Date: Jun. 7, 2012

(65) Prior Publication Data
US 2013/0210568 A1  Aug. 15, 2013

(30) Foreign Application Priority Data

Dec. 2, 2010  (JP) .................................. 2010-269194
Mar. 15, 2011  (JP) .................................. 2011-056538

(51) Int. Cl.
*F16H 1/32*  (2006.01)

(52) U.S. Cl.
USPC ...................................................... 475/178

(58) Field of Classification Search
USPC .................... 475/178, 163, 161, 331
See application file for complete search history.

(56) References Cited

U.S. PATENT DOCUMENTS

| | | | | |
|---|---|---|---|---|
| 3,985,047 | A * | 10/1976 | Therkelsen | 254/354 |
| 4,909,102 | A * | 3/1990 | Haga | 475/168 |
| 6,736,748 | B2 * | 5/2004 | Schneider et al. | 475/178 |
| 2004/0087411 | A1 * | 5/2004 | Minegishi et al. | 475/331 |
| 2004/0198543 | A1 * | 10/2004 | Christ | 475/163 |
| 2010/0292040 | A1 * | 11/2010 | Yamamoto et al. | 475/178 |

(Continued)

FOREIGN PATENT DOCUMENTS

| | | |
|---|---|---|
| JP | 58 186182 | 12/1983 |
| JP | 62 22347 | 2/1987 |

(Continued)

OTHER PUBLICATIONS

International Search Report Issued Feb. 7, 2012 in PCT/JP11/77921 Filed Dec. 2, 2011.

*Primary Examiner* — David D Le
*Assistant Examiner* — David J Hlavka
(74) *Attorney, Agent, or Firm* — Oblon, Spivak, McClelland, Maier & Neustadt, L.L.P.

(57) ABSTRACT

A crankshaft has eccentric holes communicating with each other. The eccentric hole extends in the axial direction of the crankshaft from one end surface of the crankshaft and is disposed so as to be eccentric in the same direction as a cam section. The eccentric hole extends in the axial direction of the crankshaft from the other end surface of the crankshaft and is disposed so as to be eccentric in the direction of the eccentricity of a cam section. A centrifugal force due to the rotation of the crankshaft generates a force couple about an axis which is perpendicular to the axis of the crankshaft. The force couple is reduced by the eccentric holes. The cam sections are arranged around the axis of rotation with the phases shifted by 180 degrees from each other. As a result, a translational force acting in the direction perpendicular to the axis of the crankshaft is also reduced.

6 Claims, 8 Drawing Sheets

(56) References Cited

U.S. PATENT DOCUMENTS

| | | | |
|---|---|---|---|
| 2011/0245030 A1* | 10/2011 | Wakida et al. | 475/331 |
| 2013/0023374 A1* | 1/2013 | Ishikawa et al. | 475/168 |
| 2013/0053209 A1* | 2/2013 | Ishizuka | 475/331 |

FOREIGN PATENT DOCUMENTS

| | | |
|---|---|---|
| JP | 4 22103 | 5/1992 |
| JP | 6 27533 | 4/1994 |
| JP | 2007 247684 | 9/2007 |

\* cited by examiner

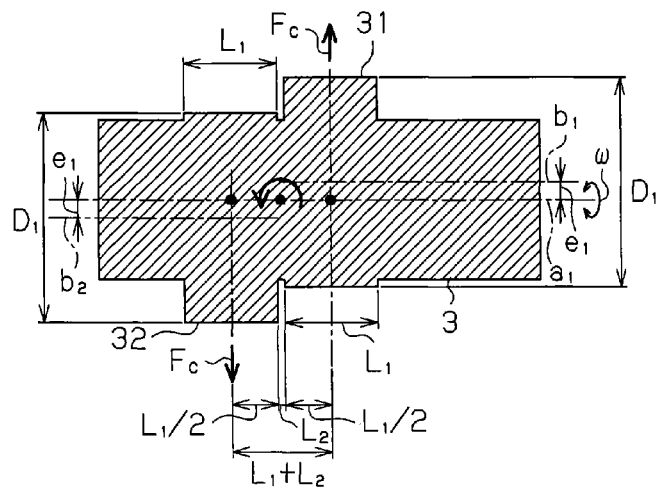
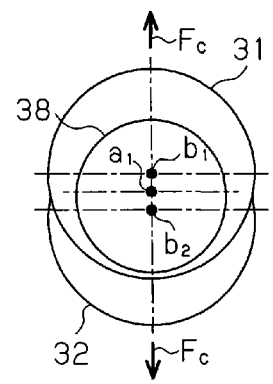
Fig.6(a)   Fig.6(b)
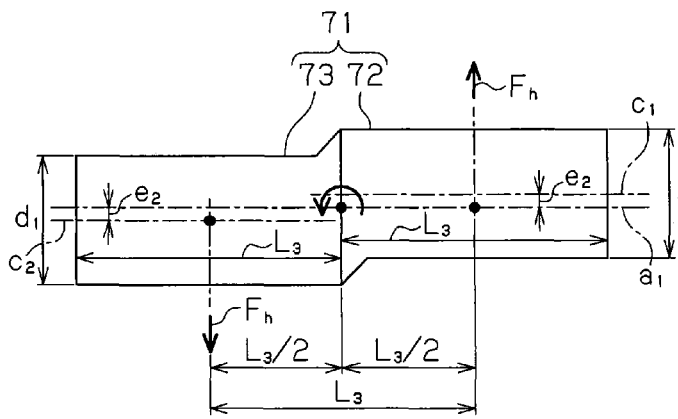
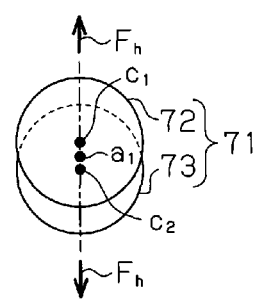
Fig.7(a)   Fig.7(b)

ECCENTRIC ROCKING TYPE REDUCTION GEAR

FIELD OF THE INVENTION

The present invention relates to an eccentric rocking type reduction gear, and more specifically, to an improvement of a rotation balance of a crank shaft that performs eccentric rocking on an external gear of the eccentric rocking type reduction gear.

BACKGROUND OF THE INVENTION

Eccentric rocking type reduction gears include a crank shaft. The crank shaft includes an eccentric cylindrical cam in order to perform eccentric rocking on an external gear. In general, the crank shaft is utilized as an input shaft, and rotates at a fast speed. Hence, fluctuating load acts on a bearing that supports the crank shaft due to centrifugal force produced inherently to the unbalanced shape of the eccentric cylindrical cam. For example, according to a reduction gear disclosed in Patent Document 1, in order to reduce such fluctuating load, the eccentric cylindrical cam is formed with a balancer weight. This suppresses the unbalance originating from the weight of the eccentric cylindrical cam.

Moreover, there are reduction gears that include two external gears. According to the reduction gears of this type, a crank shaft is provided with two eccentric cylindrical cams to support the two external gears, respectively. The respective eccentric cylindrical cams are disposed around the axial line of the crank shaft with respective phases shifted by 180 degrees from each other. This structure cancels translational force.

As explained above, according to the reduction gear of Patent Document 1, the balancer weight is formed inwardly of the eccentric cylindrical cam. This balancer weight eliminates the unbalance around the axial line of the crank shaft. However, the unbalance around the axial line orthogonal to the axial line of the crank shaft still remains unaddressed. Accordingly, couple is produced around the axial line orthogonal to the axial line of the crank shaft due to centrifugal force.

According to the reduction gears having the two external gears, the two eccentric cylindrical cams are disposed around the axial line of the crank shaft with respective phases being shifted by 180 degrees from each other. According to such a structure, the unbalance around the axial line of the crank shaft can be also addressed. However, the unbalance around the axial line orthogonal to the axial line of the crank shaft still remains unaddressed. Hence, couple is still produced around the axial line orthogonal to the axial line of the crank shaft.

The couple around the axial line orthogonal to the axial line of the crank shaft also applies fluctuating load to the bearing supporting the crank shaft. This often results in the shortage of the lifetime of the bearing. Moreover, the eccentric rocking type reduction gear is likely to generate vibration.

PRIOR ART DOCUMENT

Patent Document

Patent Document 1: Japanese Laid-Open Patent Publication No. 2007-247684

SUMMARY OF THE INVENTION

It is an object of the present invention to provide an eccentric rocking type reduction gear which reduces fluctuating load acting on a bearing due to a rotation of a crank shaft to extend the lifetime of the bearing, and which also suppresses a generation of vibration.

To accomplish the above object, a first aspect of the present invention provides an eccentric rocking type reduction gear comprising an internal gear, two external gears meshed with the internal gear, a crank shaft supporting both of the external gears, and a carrier rotating together with a rotation of both of the external gears, the crank shaft comprising first and second cylindrical cams disposed around an axial line of the crank shaft with respective phases being shifted by 180 degrees and in a manner offset from a rotation center of the crank shaft, both of the external gears being supported by the first and second cylindrical cams, respectively, in a freely rotatable manner and in a manner revolvable around an axial line of the internal gear, the carrier comprising a plurality of output pins fastened around an axial line of the carrier at an equal interval, each of the output pins being engaged with a plurality of through-holes provided in both of the external gears to be linked with a rotation movement of both of the external gears, the crank shaft being rotated as an input shaft and either one of the internal gear and the carrier being rotated as an output shaft, first and second eccentric holes which run in an axial direction of the crank shaft, and which are in communication with each other being formed in the crank shaft, the first eccentric hole running from a first end face of the crank shaft to a center position of the crank shaft in the axial direction, and being disposed in a manner offset in a same direction as that of the first cylindrical cam, and the second eccentric hole running from a second end face of the crank shaft to the center position of the crank shaft in the axial direction, and being disposed in a manner offset in a same direction as that of the second cylindrical cam.

According to such a structure, the first and second cylindrical cams are disposed around the crank shaft with respective phases being shifted from each other by 180 degrees. Hence, translational force due to centrifugal force acting on the crank shaft can be reduced. Moreover, the first and second eccentric holes reduce the moment of couple due to the centrifugal force acting on the crank shaft. Since both translational force and moment of couple are reduced as explained above, fluctuating load acting on the bearing supporting the crank shaft can be reduced. Accordingly, the lifetime of the bearing can be extended. Moreover, vibration caused by the reduction gear can be reduced.

In the above-explained eccentric rocking type reduction gear, it is preferable that axial-end balance adjusting portions which adjust a weight balance are provided at both ends of the crank shaft.

According to such a structure, the axial-end balance adjusting portions are provided at both ends of the crank shaft. Accordingly, the arm of couple can have the maximum length. Hence, when couple is produced around an axial line orthogonal to the axial line of the crank shaft, the adjustment for accomplishing the balancing can be reduced as much as possible.

In the above-explained eccentric rocking type reduction gear, it is preferable that the axial-end balance adjusting portions are provided at both end faces of the crank shaft, and are chamfers provided at respective circumference edges of openings of the first and second eccentric holes.

According to such a structure, by increasing the chamfering level in a chamfering process, the rotation balance of the crank shaft can be adjusted finely without any special process.

In the above-explained eccentric rocking type reduction gear, it is preferable that the axial-end balance adjusting portions are balancer weights provided at both ends of the crank shaft, respectively.

According to such a structure, by increasing or decreasing the weight of the balancer weight, the rotation balance of the crank shaft can be adjusted finely even after the assembling of the crank shaft is completed.

To accomplish the above object, a second of the present invention provides An eccentric rocking type reduction gear comprising an internal gear, two external gears meshed with the internal gear, a hollow crank shaft supporting both of the external gears, and a rotating carrier rotating together with a rotation of both of the external gears, the crank shaft comprising first and second cylindrical cams disposed around an axial line of the crank shaft with respective phases being shifted by 180 degrees and in a manner offset from a rotation center of the crank shaft, both of the external gears being supported by the first and second cylindrical cams, respectively, in a freely rotatable manner and in a manner revolvable around an axial line of the internal gear, the carrier comprising a plurality of output pins fastened around an axial line of the carrier at an equal interval, each of the output pins being engaged with a plurality of through-holes provided in both of the external gears to be linked with a rotation movement of both of the external gears, the crank shaft being rotated as an input shaft and either one of the internal gear and the carrier being rotated as an output shaft, two recesses being provided in an inner periphery of the crank shaft, and the respective recesses being disposed at opposite sides along offset directions of the first and second cylindrical cams, and being disposed at different positions along an axial direction of the crank shaft.

According to such a structure, the first and second cylindrical cams are disposed around the crank shaft with respective phases being shifted from each other by 180 degrees. Hence, translational force due to centrifugal force acting on the crank shaft can be reduced. Moreover, the two recesses are disposed in the inner periphery of the crank shaft at opposite sides to each other along respective offset directions of the first and second cylindrical cams. The respective recesses are disposed at different positions from each other along the axial direction of the crank shaft. In this case, both recesses cancel couple acting on the crank shaft when no such recesses are provided. Accordingly, moment of couple due to the centrifugal force acting on the crank shaft can be reduced. Since both translational force and moment of couple are reduced as explained above, fluctuating load acting on the bearing supporting the crank shaft can be reduced. Hence, the lifetime of the bearing can be extended.

BRIEF DESCRIPTION OF THE DRAWINGS

FIG. 6(a) is a vertical cross-sectional view illustrating the crank shaft in an axial condition, and FIG. 6(b) is a right side view illustrating the crank shaft in the axial condition;

FIG. 7(a) is a front view illustrating a solid member, and FIG. 7(b) is a right side view illustrating the solid member;

DETAILED DESCRIPTION OF THE PREFERRED EMBODIMENTS

An embodiment of the present invention in which an eccentric rocking type reduction gear thereof is applied to a joint of a robot arm will now be explained with reference to FIG. 1 to FIGS. 9(a) and 9(b).

<Structure of Reduction Gear>

Figure 1:
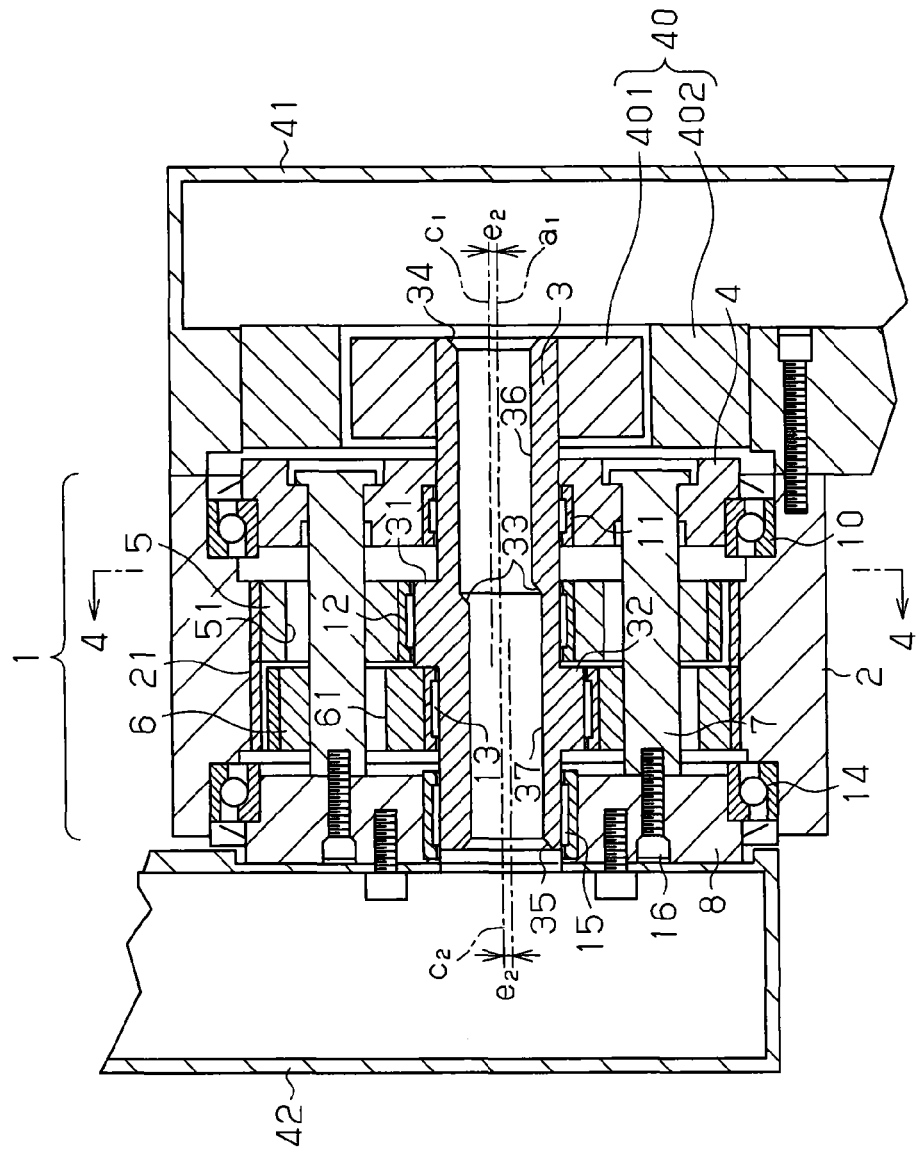
FIG. 1 is a vertical cross-sectional view illustrating an eccentric rocking type reduction gear according to an embodiment of the present invention (a cross-sectional view taken along a line 1-1 in FIG. 4)

As illustrated in FIG. 1, an eccentric rocking type reduction gear 1 is provided between a first arm 41 and a second arm 42. The reduction gear 1 includes a cylindrical housing 2 and a pair of side plates 4 and 8. The housing 2 is fastened to the first arm 41. The side plate 4 is supported through a bearing 10 in a freely rotatable manner to an end of the housing 2 facing the first arm 41. The side plate 8 is supported through a bearing 14 in a freely rotatable manner to an end of the housing 2 facing the second arm 42. A crank shaft 3 is supported at the center of the housing 2 through the two side plates 4 and 8. The side plate 4 holds a bearing 11. The side plate 8 holds a bearing 15. The crank shaft 3 is supported through both bearings 11 and 15 in a freely rotatable manner to both side plates 4 and 8.

Figure 2:
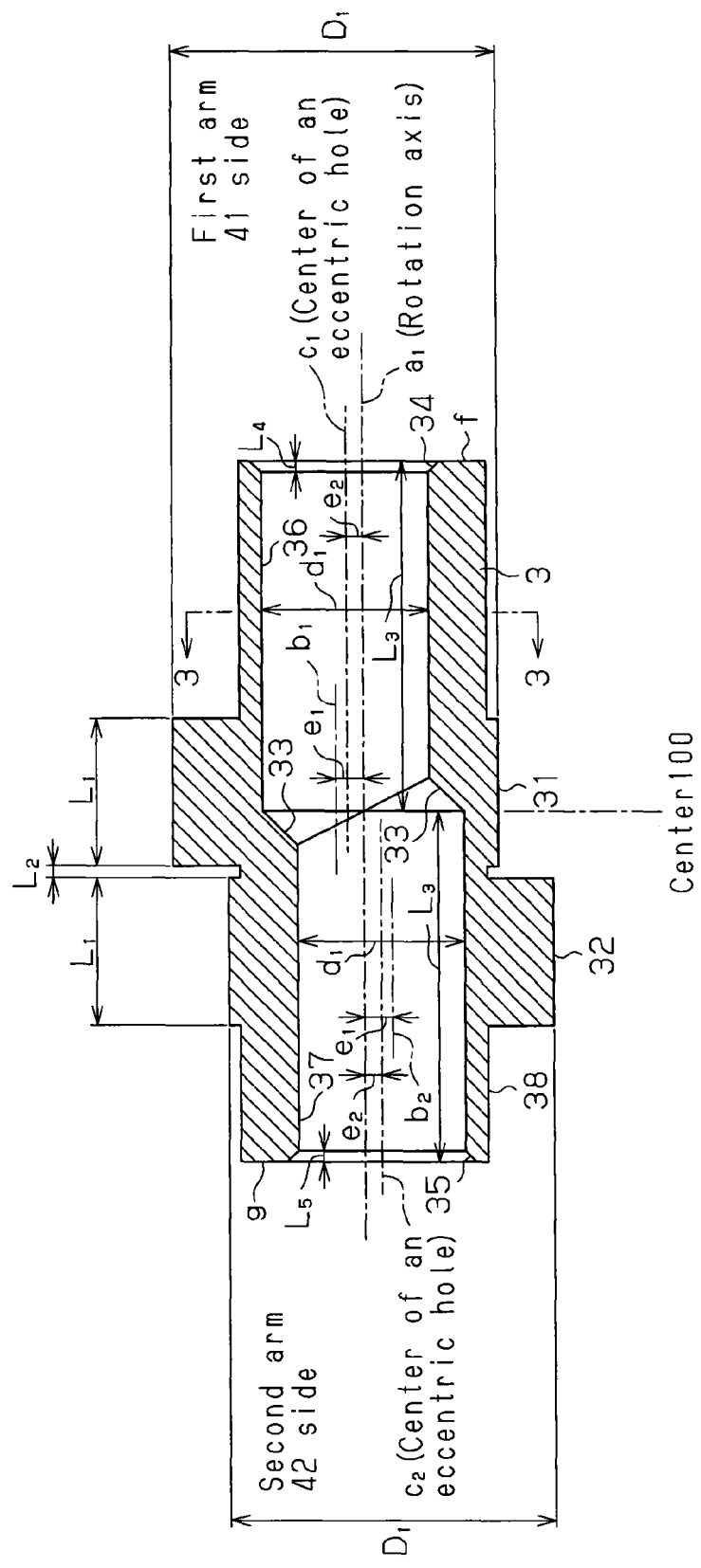
FIG. 2 is a vertical cross-sectional view illustrating a crank shaft (a cross-sectional view taken along a line 2-2 in FIG. 3)
Figure 3:
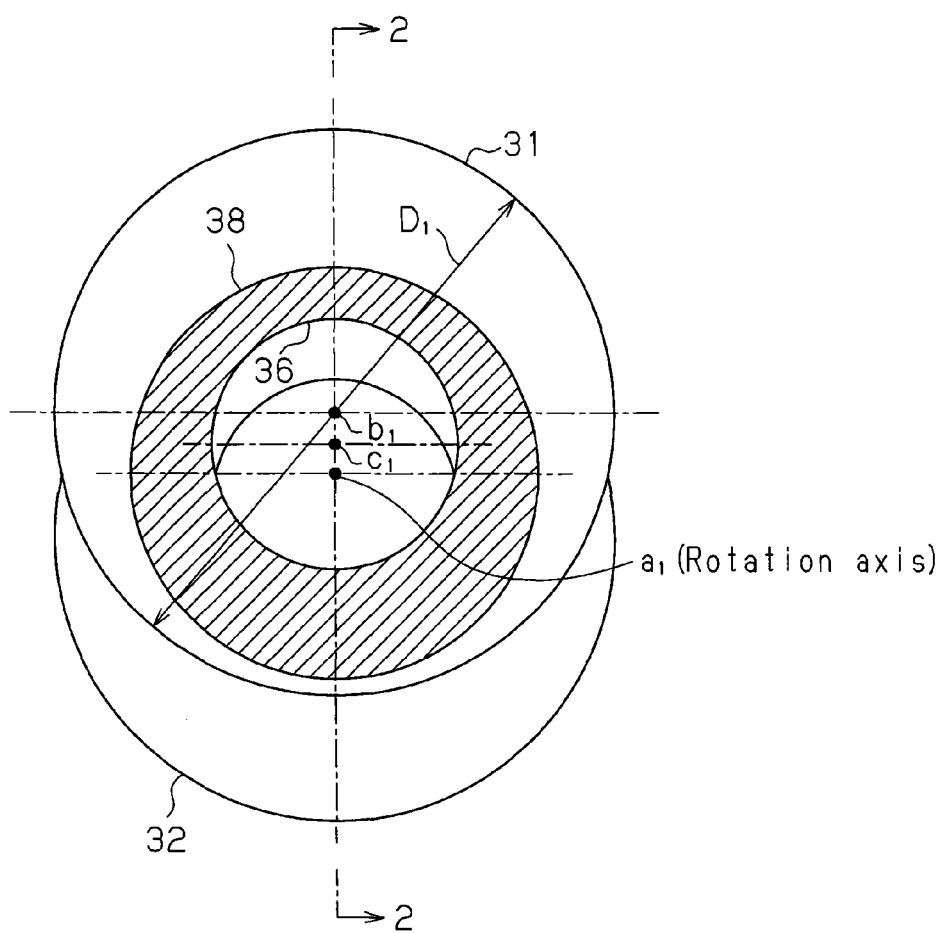
FIG. 3 is a cross-sectional view taken along a line 3-3 in FIG. 2.

Two cylindrical cams 31 and 32 are formed integrally at the center of the crank shaft 3. As illustrated in FIG. 2, the respective cams 31 and 32 are disposed in an eccentric manner by an offset level $e_1$ from a rotation axis $a_1$ of the crank shaft 3. The cam 31 is disposed in an eccentric manner to the rotation axis $a_1$ in the opposite direction (vertical direction in FIG. 1) to the cam 32. As illustrated in FIG. 3, the cam 31 is disposed around the rotation axis $a_1$ of the crank shaft 3 with a phase shifted by 180 degrees from the cam 32. In FIG. 3, the cam 31 is disposed in a manner shifted upwardly of the rotation axis $a_1$. The cam 32 is disposed in a manner shifted downwardly of the rotation axis $a_1$.

Figure 4:
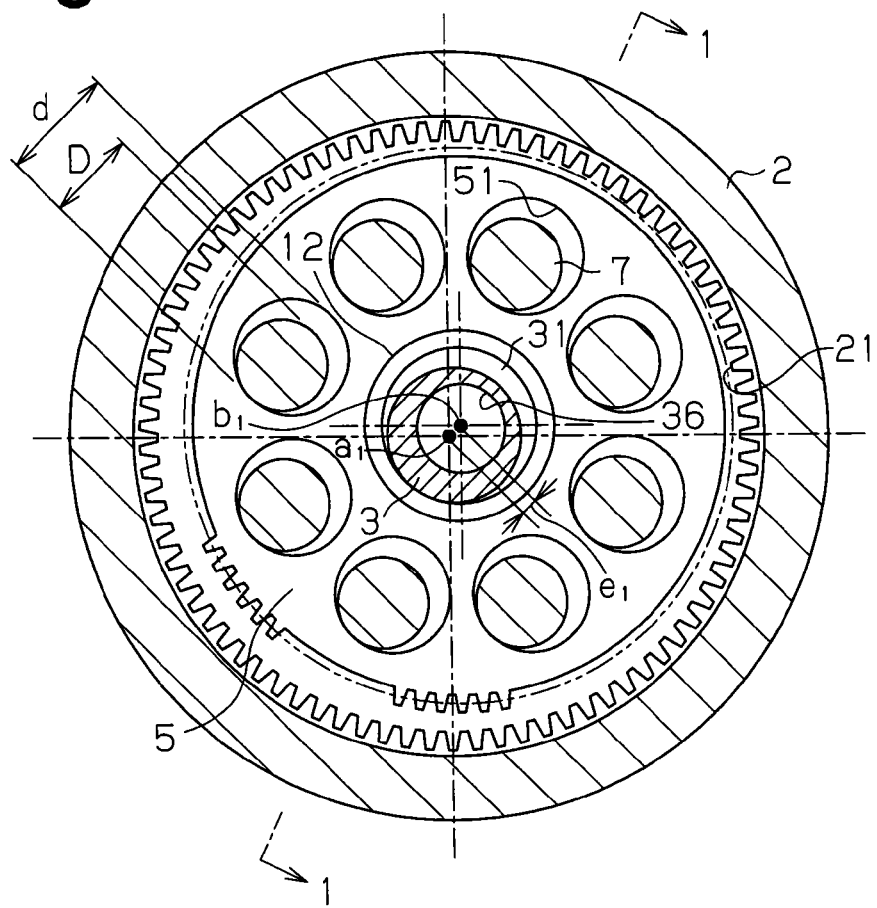
FIG. 4 is a cross-sectional view taken along a line 4-4 in FIG. 1.

As illustrated in FIG. 1, an external gear 5 is supported on the outer periphery of the cam 31 in a freely rotatable manner through a bearing 12. An external gear 6 is supported on the outer periphery of the cam 32 in a freely rotatable manner through a bearing 13. As illustrated in FIG. 4, a plurality of through-holes 51 are formed in the external gear 5. A plurality of through-holes 61 are formed in the external gear 6. The respective through-holes 51 are disposed at an equal interval around the rotation center of the external gear 5 offset by the offset level $e_1$ from the rotation axis $a_1$ of the crank shaft 3. Moreover, the respective through-holes 61 are disposed at an equal interval around the rotation center of the external gear 6 offset by the offset level $e_1$ from the rotation axis $a_1$ of the crank shaft 3. Respective axial lines of the through-holes 51 and 61 are parallel to the rotation axis $a_1$ of the crank shaft 3.

As illustrated in FIG. 1, the side plate 4 holds a plurality of output pins 7. The number of the output pins 7 is consistent with the number of the respective through-holes 51 and 61. As illustrated in FIG. 4, the respective output pins 7 are disposed at an equal interval around the rotation axis $a_1$ of the crank shaft 3. As illustrated in FIG. 1, respective axial lines of the outer pins 7 are also parallel to the rotation axis $a_1$ of the crank shaft 3. The respective output pins 7 pass through the respective through-holes 51 and 61 of the external gears 5 and 6. A tip of each output pin 7 abuts the internal face of the side plate 8. Bolts 16 are inserted in the side plate 8 from the external side. Each output pin 7 is tightened by each bolt 16, thereby being fastened to the side plate 8.

As illustrated in FIG. 4, an internal gear 21 is formed on the inner periphery of the housing 2. As is indicated by dashed lines in FIG. 4, the external gears 5 and 6 have a pitch circle diameter in such a way that those gears mesh with the internal gear 21 at one location. Together with the rotation of the crank shaft 3, the external gears 5 and 6 revolve around the rotation axis $a_1$ of the crank shaft 3 while being meshed with the internal gear 21. The revolution radius of the external gears 5 and 6 is consistent with the offset level $e_1$ from the rotation axis $a_1$ of the crank shaft 3. The through-holes 51 and 61 have an internal diameter d expressed by the following formula (1). The external gear 5 rotates while always causing the inner periphery of the through-hole 51 to contact the outer periphery of the output pin 7. The external gear 6 rotates while always causing the inner periphery of the through-hole 61 to contact the outer periphery of the output pin 7.

$$d = 2 \cdot e_1 + D \tag{1}$$

where $e_1$ is the offset level of the cams 31 and 32, and D is the external diameter of the output pin 7.

As illustrated in FIG. 1, a motor 40 includes a rotor 401 and a stator 402. The rotor 401 is fastened to an end of the crank shaft 3 facing the first arm 41. The stator 402 is fastened to a coupling part (joint) with the housing 2 in the first arm 41. The stator 402 is disposed coaxially with the rotation axis $a_1$ of the crank shaft 3. The crank shaft 3 rotates by allowing a current to flow through the stator 402. The side plate 8 has an external face fastened with the second arm 42. The second arm 42 turns around the axial line of the second arm 42 together with the rotation of the side plate 8. At this time, the second arm 42 turns relative to the first arm 41 at a turning speed obtained by the rotation motion of the motor 40 having undergone the speed reduction by the reduction gear 1.

<Crank Shaft>

Next, an explanation will be given of a shape of the crank shaft 3 in detail.

As illustrated in FIG. 2, the crank shaft 3 includes, in addition to the above-explained two cams 31 and 32, a cylindrical part 38. The cylindrical part 38 has its center matching the rotation axis $a_1$ of the crank shaft 3. The cam 31 is disposed in such a manner as to be distant from the cam 32 by an interval $L_2$ along the rotation axis $a_1$. The cams 31 and 32 have the same width $L_1$ and the same external diameter $D_1$. Two eccentric holes 36 and 37 in communication with each other are formed in the crank shaft 3. The respective eccentric holes 36 and 37 run along the rotation axis $a_1$.

As illustrated in the right part of FIG. 2, the eccentric hole 36 runs from an axial end f (first end face) of the crank shaft 3 facing the first arm 41 to a center 100 of the crank shaft 3 along the axial line of the crank shaft 3. The eccentric hole 36 has a length $L_3$ with reference to the axial end f. The eccentric hole 36 is disposed in such a manner as to be offset by an offset level $e_2$ to the rotation axis $a_1$ in the same direction (upward direction in FIG. 2) as that of the cam 31. The eccentric hole 36 has an internal diameter which is an internal diameter $d_1$.

As illustrated in the left part of FIG. 2, the eccentric hole 37 runs from an axial end g (second end face) of the crank shaft 3 facing the second arm 42 to the center 100 along the axial line of the crank shaft 3. The eccentric hole 37 has a length $L_3$ with reference to the axial end g. That is, the length of the eccentric hole 37 is the same as that of the eccentric hole 36. The eccentric hole 37 is disposed in such a manner as to be offset by the offset level $e_2$ to the rotation axis $a_1$ in the same direction (downward direction in FIG. 2) as that of the cam 32. The eccentric hole 37 has an internal diameter that is an internal diameter $d_1$. The internal diameter of the eccentric hole 37 is the same as that of the eccentric hole 36.

The axial end f of the crank shaft 3 has a chamfer 34 formed around the entire circumference of the open end of the eccentric hole 36. Likewise, the axial end g of the crank shaft 3 has a chamfer 35 around the entire circumference of the open end of the eccentric hole 37. A communicated-part chamfer 33 is formed at a communicated part between the eccentric hole 36 and the eccentric hole 37. The communicated-part chamfer 33 is formed at, in the inner periphery of the crank shaft 3, a part near the cam 31 (the upper part in FIG. 2) and a part near the cam 32 (the lower part in FIG. 2), respectively. The upper communicated-part chamfer 33 is an inclined surface, and is inclined from the center 100 in such a manner as to become close to the inner periphery of the eccentric hole 37 toward the axial end g. The lower communicated-part chamfer 33 is also an inclined surface, and is inclined from the center 100 in such a manner as to become close to the inner periphery of the eccentric hole 36 toward the axial end f.

The respective parts of the crank shaft 3 have dimensions that satisfy the following formula (2).

$$e_1 \cdot D_1^2 \cdot L_1 (L_1 + L_2) = e_2 \cdot d_1^2 \cdot L_3^2 \tag{2}$$

where $e_1$ is the offset level of the cams 31 and 32, $D_1$ is the external diameter of the cams 31 and 32, $L_1$ is the width of the cams 31 and 32, and $L_2$ is an interval between the cams 31 and 32. $e_2$ is an offset level of the eccentric holes 36 and 37, $d_1$ is the internal diameter of the eccentric holes 36 and 37, and $L_3$ is the length of the eccentric holes 36 and 37.

<Operation of External Gear>

Next, an explanation will be given of the two external gears 5 and 6.

As illustrated in FIG. 4, when the crank shaft 3 rotates, the external gear 5 revolves around the rotation axis $a_1$ of the crank shaft 3 while being meshed with the internal gear 21 of the housing 2. At this time, when the number of gear teeth of the external gear 5 is $Z_1$ and the number of gear teeth of the internal gear 21 is $Z_2$, the external gear 5 rotates relative to the crank shaft 3 by what corresponds to the difference in the number of gear teeth represented by $Z_2 - Z_1$ every time the crank shaft 3 performs one turn. That is, the external gear 5 revolves by one turn along the orbit of a circle having a radius that is the offset level $e_1$ relative to the housing 2, and also rotates by $(Z_2 - Z_1)/Z_1$. The rotation motion of the external gear 5 is transmitted to the side plates 4 and 8 that are output shafts through respective contacts between the through-holes 51 and the output pins 7. Like the external gear 5, the rotation motion of the external gear 6 is transmitted to the side plates 4 and 8 through respective contacts between the through-holes 61 and the output pins 7. In the present embodiment, the side plates 4 and 8 construct a carrier that is linked with the rotation motion of the external gears 5 and 6.

For example, the robot arm has a drive device attached to the joint. There is a demand for such a drive device that it should be lightweight and have a high torque output. In this case, the eccentric rocking type reduction gear 1 is effective which can allow a compact drive motor to rotate at a fast speed, and which can perform speed reduction on such a rotation at a large reduction ratio to output high torque. According to the reduction gear 1 of this type, the crank shaft 3 that is an input shaft rotates at a fast speed. Hence, when the crank shaft 3 has an unbalanced portion, a fluctuating load due to centrifugal force, acts on the bearings 11 and 15. In order to reduce such fluctuating load, it is necessary to let the crank shaft 3 to be balanced highly precisely.

<Balancing of Crank Shaft>

Next, an explanation will be given of the balancing of the crank shaft 3 in detail. First, a case in which the crank shaft 3 is a solid shaft will be examined.

As illustrated in FIG. 6(*a*), when the crank shaft 3 is a solid shaft (when there is no eccentric holes 36 and 37), centrifugal force F, acting on the crank shaft 3 can be expressed as the following formula (3).

$$F_c = M_c \cdot e_1 \cdot \omega^2 \quad (3)$$

where $M_c$ is the mass of cam 31, 32, $e_1$ is the offset level of the cam 31, 32, and $\omega$ is the rotation speed of the cam 31, 32. The two cams 31 and 32 have the same offset level $e_1$, $e_1$ and mass $M_c$, $M_c$.

Moreover, the mass $M_c$ can be expressed by the following formula (4).

$$M_c = \rho \cdot \pi D_1^2 \cdot L_1 / 4 \quad (4)$$

where $\rho$ is the density of the crank shaft 3 when it is a solid shaft, $D_1$ is the external diameter of the cam 31, 32, and $L_1$ is the width of the cam 31, 32.

Hence, when the formula (4) is applied to the formula (3), the centrifugal force $F_c$ can be expressed as the following formula (5).

$$F_c = \rho \cdot \pi \cdot D_1^2 \cdot L_1 \cdot e_1 \cdot \omega^2 / 4 \quad (5)$$

(5) As explained above, the cams 31 and 32 are disposed around the rotation axis $a_1$ of the crank shaft 3 in such a way that the cam 31 has the phase shifted by 180 degrees from the cam 32 as illustrated in FIG. 6(*b*). Accordingly, the centrifugal force $F_c$ by the cam 31 acts around the rotation axis $a_1$ of the crank shaft 3 in such a way that the phase is shifted by 180 degrees from the centrifugal force $F_c$ of the cam 32. That is, the centrifugal force $F_c$ by the cam 31 acts in the opposite direction to the centrifugal force $F_c$ by the cam 32. In the condition illustrated in FIGS. 6(*a*) and 6(*b*), the upward centrifugal force $F_c$ by the cam 31 and the downward centrifugal force $F_c$ by the cam 32 act on the crank shaft 3, respectively.

As illustrated in FIG. 6(*a*), respective working points of the centrifugal forces $F_c$ and $F_c$ by the cams 31 and 32 are disposed on the rotation axis $a_1$ of the crank shaft 3. The working point of the centrifugal force $F_c$ by the cam 31 is disposed in a manner corresponding to the center of the cam 31 in the axial direction. The working point of the centrifugal force $F_c$ by the cam 32 is disposed in a manner corresponding to the center of the cam 32 in the axial direction. As explained above, the cams 31 and 32 are disposed in such a manner as to be distant from each other by the interval $L_2$ along the axial direction of the crank shaft 3. Hence, the working points of the centrifugal forces $F_c$ and $F_c$ by the cams 31 and 32 are distant from each other by a distance $L_1 + L_2$ (=$L_1/2 + L_2 + L_1/2$). That is, the centrifugal forces $F_c$, $F_c$ by the cams 31 and 32 are equal to the concentrated loads acting at the two working points distant from each other by the distance $L_1 + L_2$ in the opposite directions and having the same magnitude.

Hence, the translational forces acting on the crank shaft 3 are canceled from each other. The translational force means force that causes the crank shaft 3 to move linearly in the direction orthogonal to the rotation axis $a_1$. For example, FIGS. 6(*a*) and 6(*b*) illustrate the condition in which the two cams 31 and 32 are disposed in the opposite sides along the vertical direction. In this condition, as illustrated in FIG. 6(*b*), when the crank shaft 3 is viewed from the axial direction, the centrifugal forces $F_c$, $F_c$ by the cams 31 and 32 act on the weight center of the crank shaft 3, i.e., the rotation axis $a_1$ illustrated in the figure. At this time, the centrifugal force $F_c$ by the cam 31 acts as the translational force that causes the crank shaft 3 to move in the upward direction. The centrifugal force $F_c$ by the cam 32 acts as the translational force that causes the crank shaft 3 to move in the downward direction. As explained above, the centrifugal forces $F_c$, $F_c$ by the cams 31 and 32 act in the opposite directions and with the same magnitude, and thus the translational forces acting on the crank shaft 3 are subtracted and become zero at total. In this case, the moment of forces around the rotation axis $a_1$ of the crank shaft 3 is balanced. Accordingly, the unbalance around the rotation axis $a_1$ can be addressed.

When, however, the crank shaft 3 is viewed from a direction orthogonal to the offset direction of the cams 31 and 32 (the vertical direction in FIG. 6(*b*)), i.e., when the crank shaft 3 is viewed from the horizontal direction in FIG. 6(*b*), as illustrated in FIG. 6(*a*), the centrifugal forces $F_c$, $F_c$ by the cams 31 and 32 act as the couple to the crank shaft 3. Accordingly, the moment of the couple with the magnitude of $F_c \cdot (L_1 + L_2)$ acts on the crank shaft 3 in the left-turn direction in FIG. 6(*a*). According to the present embodiment, in order to suppress the moment of the couple, the crank shaft 3 is formed with the eccentric holes 36 and 37.

The effect of the eccentric holes 36 and 37 acting on the centrifugal force of the crank shaft 3 is equivalent to the subtraction of the effect of the centrifugal force acting on the solid member matching the shapes of the eccentric holes 36 and 37. The effect of the centrifugal force acting on a solid member 71 is as follow. The eccentric holes 36 and 37 are disposed in an offset manner by the same offset level $e_2$ from the rotation axis $a_1$. Hence, as illustrated in FIG. 7(*a*), a first portion 72 corresponding to the eccentric hole 36 of the solid member 71 and a second portion 73 corresponding to the eccentric hole 37 are disposed in an offset manner by the same offset level $e_2$ relative to the rotation axis $a_1$. Moreover, the first and second portions 72 and 73 have the same mass $M_h$. Accordingly, centrifugal force $F_h$ by the first and second portions 72 and 73 can be expressed as the following formula (6).

$$F_h = M_h \cdot e_2 \cdot \omega^2 \quad (6)$$

where $M_h$ is the mass of the first and second portions 72, 73, $e_2$ is the offset level of the first and second portions 72, 73 relative to the rotation axis $a_1$, and $\omega$ is a rotation speed.

Moreover, the mass can be expressed by the following formula (7).

$$M_h = \rho \cdot \pi \cdot d_1^2 \cdot L_3 / 4 \quad (7)$$

where $\rho$ is the density of the solid member, $d_1$ is the internal diameter of the eccentric hole 36 (in this example, the external diameter of the first and second portions 72, 73), and $L_3$ is the length of the eccentric holes 36, 37 along the rotation axis $a_1$ (in this example, the length of the first and second portions 72, 73).

Hence, when the formula (7) is applied to the formula (6), the centrifugal force $F_h$ by the first and second portions 72, 73 can be expressed as the following formula (8).

$$F_h = \rho \cdot \pi \cdot d_1^2 \cdot L_3 \cdot e_2 \cdot \omega^2 / 4 \qquad (8)$$

As explained above, the eccentric holes 36 and 37 are disposed in such a way that respective phases are shifted by 180 degrees from each other around the rotation axis $a_1$. Accordingly, as illustrated in FIG. 7(b), the first and second portions 72 and 73 are disposed in such a way that respective phases are shifted by 180 degrees from each other around the rotation axis $a_1$. Moreover, the eccentric holes 36 and 37 adjoin to each other and are in communication with each other in the axial direction. Hence, the first and second portions 72, 73 have the shape joined with each other along the rotation axis $a_1$.

As illustrated in FIG. 7(a), respective working points of the centrifugal forces $F_h$, $F_h$ by the first and second portions 72, 73 are disposed on the rotation axis $a_1$ of the crank shaft 3. The working point of the centrifugal force $F_h$ by the first portion 72 is disposed in a manner corresponding to the center of the first portion 72 in the axial direction. The working point of the centrifugal force $F_h$ by the second portion 73 is disposed in a manner corresponding to the center of the second portion 73 in the axial direction. Accordingly, the working points of the centrifugal forces $F_h$, $F_h$ by the first and second portions 72, 73 are distant from each other by a distance $L_3$ (=$L_3/2+L_3/2$). Accordingly, the centrifugal forces $F_h$, $F_h$ by the first and second portions 72, 73 are equivalent to the concentrated loads acting on the two working points distant from each other by the length $L_3$ in the opposite directions and with the same magnitude. Hence, likewise the above-explained cams 31 and 32, when the solid member 71 is viewed from the axial direction, the translational forces acting on the solid member 71 are canceled. That is, as illustrated in FIG. 7(b), the centrifugal force $F_h$ acting in the upward direction and the centrifugal force $F_h$ acting in the downward direction are canceled from each other.

When, however, the solid member 71 is viewed from the direction orthogonal to the offset direction of the first and second portions 72 and 73, the centrifugal forces $F_h$, $F_h$ acting on the first and second portions 72, 73, respectively act as couple to the solid member 71 as illustrated in FIG. 7(a). That is, a moment of the couple with the magnitude of $F_h \cdot L_3$ acts on the solid member 71 in the left-turn direction in FIG. 7(a). Hence, the effect of the eccentric holes 36, 37 given to the centrifugal force of the crank shaft 3 is the moment of couple that is $-F_h \cdot L_3$ in the left-turn direction in FIG. 2.

Accordingly, the effect of the centrifugal force acting on the crank shaft 3 with the two eccentric holes 36, 37 is as follow. First, when the crank shaft 3 is viewed from the axial direction, the centrifugal force acting in the upward direction in FIG. 3 and the centrifugal force acting in the downward direction are canceled from each other. Accordingly, no translational force acts on the crank shaft 3. Next, as illustrated in FIG. 2, when the crank shaft 3 is viewed from the direction orthogonal to the offset direction of the cams 31, 32, the moment of couple with a magnitude expressed by the following formula (9) acts on the crank shaft 3 in the left-turn direction in FIG. 2.

Moment of couple=$F_c \cdot (L_1 + L_2) - F_h L_3$ (9)

When the formula (5) and the formula (8) are applied to the formula (9), the moment of couple acting on the crank shaft 3 can be expressed as the following formula (10).

Moment of couple=$\{D_1^2 \cdot L_1 \cdot (L_1+L_2) \cdot e_1 - d_1^2 \cdot L_3^2 \cdot e_2\} \cdot \rho \cdot \pi \cdot \omega^2/4$ (10)

Respective dimension of the portions of the crank shaft 3 are designed so as to satisfy the relational expression of the above-explained formula (2). When the formula (2) is applied to the formula (10), it becomes clear that the moment of couple becomes zero.

In practice, it is necessary to consider centrifugal force F' of the external gears 5 and 6 expressed by the following formula (11). When this centrifugal force F' is taken into consideration, the formula (9) becomes the following formula (12).

$$F' = m' \cdot e_1 \omega^2 \qquad (11)$$

where m' is the mass of the external gear 5, 6.

$$(F_c + F') \cdot (L_1 + L_2) - F_h \cdot L_3 \qquad (12)<$$

<Couple by Chamfering>

The couple in the left-turn direction in FIG. 2 acts on the crank shaft 3 due to the communicated-part chamfer 33. However, couple in the right-turn direction also acts on the crank shaft 3 by the chamfers 34 and 35 at the axial ends. Accordingly, couple by the communicated-part chamfer 33 in the left-turn direction and couple by the chamfers 34 and 35 in the right-turn direction can be canceled from each other. A detailed explanation will be below given of the effects of the communicated-part chamfer 33 and the chamfers 34 and 35 working on the moment of the couple of the crank shaft 3.

First, the moment of couple by the communicated-part chamfer 33 will be explained.

Figure 8A:
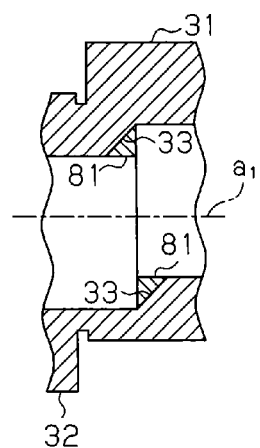
FIG. 8(a) is a vertical cross-sectional view of the crank shaft having a communication portion not chamfered.
Figure 8B:
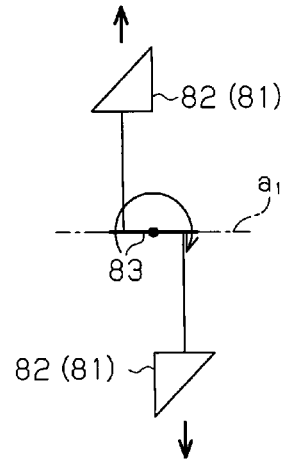
FIG. 8(b) is a model diagram for explaining coupling by chamfered communication portion.

As illustrated in FIG. 8(a), a condition in which no communicated-part chamfer 33 is provided is presumed first. That is, it is presumed that two edges 81, 81 which are eliminated when the communicated-part chamfer 33 is formed are present. As illustrated in FIG. 8(b), the two edges 81, 81 can be expressed as a model having two weights 82, 82 joined to an axis 83 matching the rotation axis $a_1$. Using this model, the two weights 82, 82 are rotated around the axis 83 (rotation axis $a_1$). When the two weights 82, 82 are disposed at opposite sides in the vertical direction, a moment of couple in the right-turn direction is produced by centrifugal forces acting on both two weights 82, 82.

Conversely, a condition in which the communicated-part chamfer 33 is present as illustrated in FIG. 2 matches a condition in which the two weights 82, 82 are omitted from the model illustrated in FIG. 8(b). In this condition, no centrifugal force, and thus no moment of couple works. Accordingly, by providing the communicated-part chamfers 33, 33, the moment of couple in the right-turn direction acting on the crank shaft 3 can be eliminated. In other words, a moment of couple in the left-turn direction can be caused to act on the crank shaft 3.

Next, a moment of couple by the chamfers 34, 35 at the axial ends will be explained.

Figure 9A:
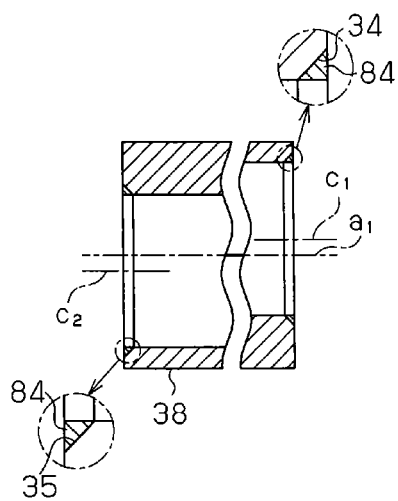
FIG. 9(a) is a vertical cross-sectional view of the crank shaft having both ends thereof not chamfered.
Figure 9B:
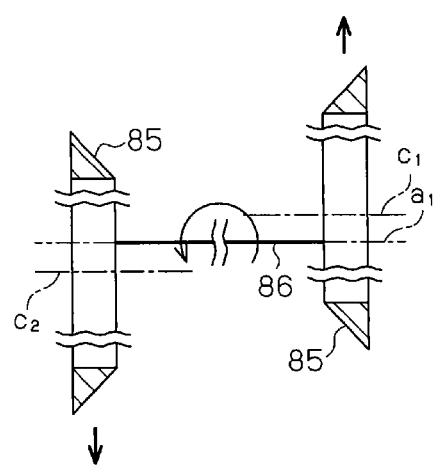
FIG. 9(b) is a model diagram for explaining coupling by chamfered both ends of the crank shaft.

As illustrated in FIG. 9(a), it is first presumed that there is no chamfers 34, 35 at the axial ends. That is, it is presumed that two ring members 84, 84 eliminated when the chamfers 34, 35 are formed are present. As illustrated in FIG. 9(b), the two members 84, 84 can be expressed as a model having two ring weights 85, 85 joined to both ends of an axis 86 matching the rotation axis $a_1$. Using this model, the two weights 85, 85 are rotated around the axis 86 (rotation axis $a_1$). When the two weights 85, 85 are disposed in an offset manner in the vertical direction, respective centrifugal forces by the two weights 85, 85 act oppositely in the vertical direction. At this time, a moment of couple in the left-turn direction is produced by the centrifugal forces of the two weights 85, 85.

Conversely, a condition in which the chamfers 34, 35 are present as illustrated in FIG. 2 matches a condition in which the two weights 85, 85 are eliminated from the model illustrated in FIG. 9(b). In this condition, no centrifugal force, and thus no moment of couple works. Accordingly, by providing the chamfers 34, 35, the moment of couple in the left-turn direction acting on the crank shaft 3 can be eliminated. In other words, a moment of couple in the right-turn direction is caused to act on the crank shaft 3.

According to the present embodiment, the communicated-part chamfer 33 and the chamfers 34, 35 are provided in such a way that the couple in the left-turn direction by the communicated-part chamfer 33 is balanced with the couple in the right-turn direction by the chamfers 34, 35. Accordingly, the couple in the left-turn direction by the communicated-part chamfer 33 and the couple in the right-turn direction by the chamfers 34, 35 can be canceled from each other. Hence, the chamfers 34, 35 function as an axial-end balancing part for finely adjusting the weight balance of the crank shaft 3.

<Adjustment of Weight Balance of Crank Shaft>

Next, an explanation will be given of the adjustment of the weight balance of the crank shaft.

As explained above, the unbalancing of the crank shaft 3 can be eliminated in principle by forming the eccentric holes 36, 37, the communicated-part chamfer 33, and the chamfers 34, 35 at the axial ends in the predetermined shape. However, unbalancing inherent to an error in shape of respective portions of the crank shaft 3 often remains. Accordingly, after this unbalancing level is measured, the chamfers 34 and 35 are finish turned by a cutting tool like a turning tool based on the measured unbalancing level. By setting depths $L_4$ and $L_5$ of the chamfers 34 and 35 illustrated in FIG. 2 to be an appropriate value in this manner, the unbalancing level of the crank shaft 3 can be easily suppressed to be equal to or smaller than a desired value.

<Insertion of Wiring>

Figure 5:
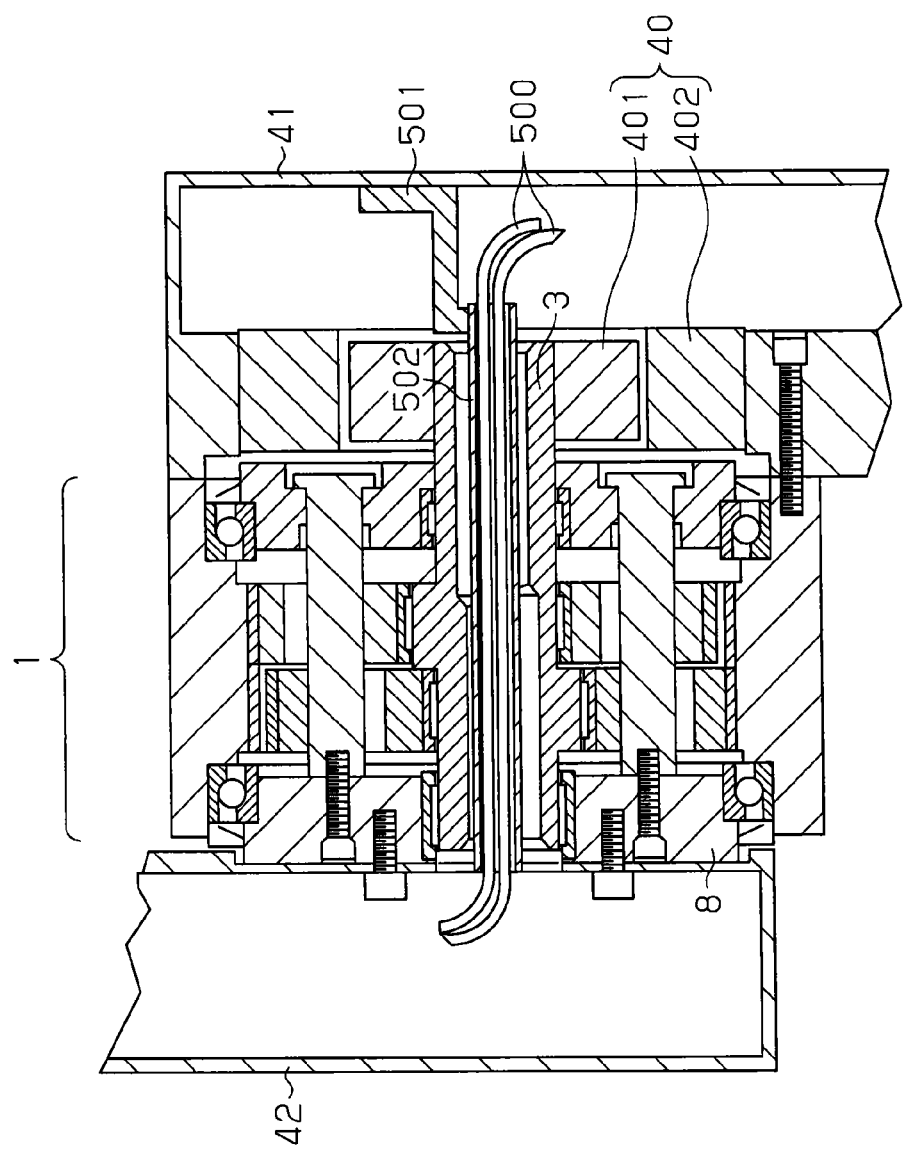
FIG. 5 is a cross-sectional view illustrating a condition in which a wiring is caused to pass through an eccentric hole of the eccentric rocking type reduction gear.

FIG. 5 illustrates an example case in which a wiring is caused to pass through the interior of the crank shaft 3 when the reduction gear 1 is applied to the joint of the robot arm. In order to cause a wiring to pass through the interior of the crank shaft 3, first, the reduction gear 1 is fastened to the first arm 41. Next, a cylindrical guide member 502 is inserted so as not to contact the crank shaft 3. A wiring bracket 501 is attached to an end of the guide member 502 facing the first arm 41. The wiring bracket 501 is fastened to the internal space of the first arm 41. Subsequently, a wiring 500 is caused to pass through the interior of a guide member 502 fastened to the first arm 41 via the wiring bracket 501. At this time, the communicated-part chamfer 33 is provided at the communicated part between the eccentric hole 36 and the eccentric hole 37. Accordingly, the wiring 500 does not get stuck on the uneven surface due to the eccentric disposition of the eccentric holes 36 and 37. Hence, the wiring 500 can be easily inserted in the guide member 502, and thus the joint of the robot arm can be easily assembled. A current is supplied to a hand (not shown) provided at the tip of the second arm 42 through the wiring 500.

Advantages of Embodiment

Hence, according to the present embodiment, the following advantages can be accomplished.

(1) The unbalancing of the crank shaft 3 when the crank shaft 3 rotates can be reduced by providing the two eccentric holes 36 and 37. This results in a reduction of the fluctuating load acting on the bearings 11 and 15 supporting the crank shaft 3. Accordingly, the lifetime of the bearing in the reduction gear 1 can be extended. Moreover, an occurrence of vibration of the reduction gear 1 originating from the unbalancing of the crank shaft 3 when it rotates can be also suppressed.

The value of the unbalancing level when the crank shaft 3 rotates, and thus the value of the fluctuating load acting on the bearings 11 and 15 supporting the crank shaft 3 can be easily suppressed to a value equal to or smaller than a desired value by simply providing the eccentric holes 36 and 37 in the crank shaft 3. Moreover, the lifetime of the bearing in the reduction gear 1 can be extended over a desired value, and the vibration of the reduction gear 1 originating from the unbalancing when the crank shaft 3 rotates can be suppressed to a value smaller than a desired value.

(2) The chamfers 34 and 35 as axial-end balance adjusting portions are provided at both ends of the crank shaft 3. In this case, the moment of couple acting on the crank shaft 3 can be adjusted by adjusting the chamfering depth, etc., of the chamfers 34 and 35. Moreover, the length of the arm of the couple can be maximized by providing the chamfers 34 and 35 at both ends of the crank shaft 3. Accordingly, when couple is produced around the axial line orthogonal to the axial line of the crank shaft 3, the adjusting level for obtaining the balancing in this case can be suppressed to a small level.

(3) The balancing of the couple acting on the crank shaft 3 is adjusted through the chamfers 34 and 35 at both ends of the crank shaft 3. Accordingly, the rotation balance of the crank shaft 3 can be adjusted finely by increasing or decreasing the chamfering level in a chamfering process without any additional special process.

(4) The lifetime of the bearings 11 and 15 of the reduction gear 1 can be extended. This also extends the lifetime of the robot, etc., using the reduction gear 1. Moreover, since vibration is little, the second arm 42 or the hand can be positioned precisely.

(5) The wiring or the pipe fitting can be caused to pass through the two eccentric holes 36 and 37 formed in the reduction gear 1. Accordingly, the wiring space for the reduction gear 1 or the robot arm can be reduced. Hence, the motion of the robot is not interfered from the exterior by the wiring, etc.

(6) The communicated-part chamfers 33, 33 are provided at the communicated part (uneven surface part) between the two eccentric holes 36 and 37. Accordingly, the insertion work of the wiring 50 is facilitated.

Other Embodiments

The present embodiment can be modified as follows.

Figure 10A:
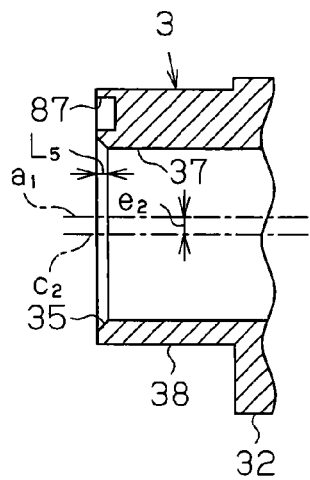
FIG. 10(a) is a vertical cross-sectional view illustrating the left end of a crank shaft according to another embodiment.
Figure 10B:
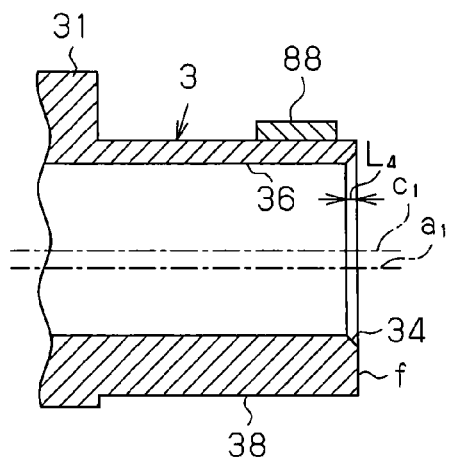
FIG. 10(b) is a vertical cross-sectional view illustrating the right end of the crank shaft.

In the present embodiment, the unbalance level of the crank shaft 3 is adjusted finely by increasing or decreasing the depths $L_4$ and $L_5$ of the chamfers 34 and 35, but the following modification can be applied. For example, as illustrated in FIG. 10(a), an additional hole 87 may be formed in at least either one end of the crank shaft 3, or as illustrated in FIG. 10(b), a balancer weight 88 may be added. Moreover, the balancing of the crank shaft 3 may be adjusted using both hole 87 and balancer weight 88. Furthermore, the balancing may be adjusted by partially cutting the circumference surface of, not the end of the crank shaft 3 but the cylindrical part 38. In this case, the hole 87 and the balancer weight 88 serve as the axial-end balance adjusting portions.

When the hole 87 is used to adjust the balancing of the couple acting on the crank shaft 3, the rotation balance of the crank shaft 3 can be adjusted finely by increasing or decreasing the number, depth, and diameter of the hole 87 even after the assembling of the crank shaft 3 completes. When the balancer weight 88 is used to adjust the balance of the couple of the crank shaft 3, the rotation balance of the crank shaft 3 can be adjusted finely by increasing or decreasing the number or weight of the balancer weight 88 even after the assembling of the crank shaft 3 completes.

Figure 11A:
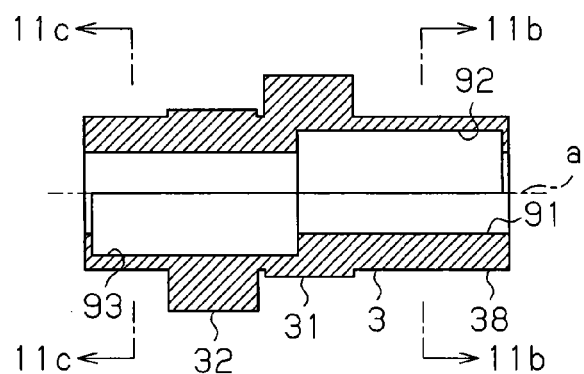
FIG. 11(a) is a vertical cross-sectional view of a crank shaft according to the other embodiment.
Figure 11B:
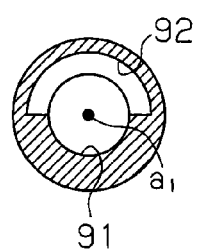
FIG. 11(b) is a cross-sectional view taken along a line 11b-11b in FIG. 11(a)
Figure 11C:
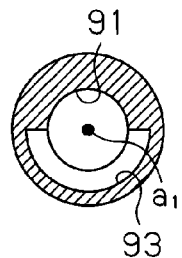
FIG. 11(c) is a cross-sectional view taken along a line 11c-11c in FIG. 11(a).

The two eccentric holes 36 and 37 are provided in the present embodiment, but the following modification can be applied. That is, as illustrated in FIG. 11(a), a hole 91 that passes all the way through the crank shaft 3 is formed along the rotation axis $a_1$. First and second recesses 92 and 93 are formed by eliminating a part of the crank shaft 3 from the inner periphery of the hole 91. The first and second recesses 92 and 93 are disposed at opposite sides along the offset directions of the cams 31 and 32, respectively. That is, the first and second recesses 92 and 93 are disposed around the rotation axis $a_1$ with respective phases being shifted by 180 degrees from each other. More specifically, as illustrated in FIG. 11(b), the first recess 92 is disposed near the cam 31 (upper side in FIG. 11(b)) in the inner periphery of the crank shaft 3. As illustrated in FIG. 11(c), the second recess 93 is disposed near the cam 32 (lower side in FIG. 11(c)) in the inner periphery of the crank shaft 3. Moreover, the first and second recesses 92 and 93 are formed across the half circumference (a range within 180 degrees) around the rotation axis $a_1$. As illustrated in FIG. 11(b), the first recess 92 is formed across the upper half circumference. As illustrated in FIG. 11(c), the second recess 93 is formed across the lower half circumference. Furthermore, as illustrated in FIG. 11(a), the first and second recesses 92 and 93 are formed at different positions in the axial direction of the crank shaft 3. The first and second recesses 92 and 93 work so as to cancel the moment of couple acting on the crank shaft 3 when no such recess is provided. Accordingly, the moment of couple by the centrifugal force acting on the crank shaft can be reduced. Therefore, the unbalancing when the crank shaft 3 rotates can be suppressed.

In the present embodiment, it is not necessary to set the dimensions of respective portions of the crank shaft 3 so as to satisfy the formula (2). In this case, also, the reducing effect of the moment of couple by the eccentric holes 36 and 37 can be accomplished, and thus the moment of couple acting on the crank shaft 3 can be reduced.

In the present embodiment, the lengths $L_3$ of the eccentric holes 36 and 37 are equal to each other, but may be different from each other. In this case, also, the couple reducing effect by the eccentric holes 36 and 37 can be accomplished.

The communicated-part chamfers 33, 33 can be omitted from the crank shaft 3. In this case, also, the couple reducing effect by the two eccentric holes 36 and 37 can be accomplished.

The chamfers 34 and 35 can be omitted from the crank shaft 3. In this case, also, the couple reducing effect by the two eccentric holes 36 and 37 can be accomplished.

In the present embodiment, the carrier including the two side plates 4 and 8 is utilized as an output shaft, but the internal gear 21 (housing 2) may be utilized as the output shaft. In this case, the joining between the housing 2 and the first arm 41 and the joining between the side plate 8 and the second arm 42 are released. The internal gear 21 (housing 2) is joined with the second arm 42.

In the present embodiment, the reduction gear 1 is applied to the joint of the robot arm, but the preset invention is not limited to this case.

The invention claimed is:
1. An eccentric rocking type reduction gear comprising:
an internal gear;
two external gears meshed with the internal gear;
a crank shaft supporting both of the external gears; and
a carrier rotating together with a rotation of both of the external gears,
the crank shaft comprising first and second cylindrical cams disposed around an axial line of the crank shaft with respective phases being shifted by 180 degrees and in a manner offset from a rotation center of the crank shaft,
both of the external gears being supported by the first and second cylindrical cams, respectively, in a freely rotatable manner and in a manner revolvable around an axial line of the internal gear,
the carrier comprising a plurality of output pins fastened around an axial line of the carrier at an equal interval,
each of the output pins being engaged with a plurality of through-holes provided in both of the external gears to be linked with a rotation movement of both of the external gears,
the crank shaft being rotated as an input shaft and either one of the internal gear and the carrier being rotated as an output shaft,
first and second eccentric holes which run in an axial direction of the crank shaft and which are in communication with each other being formed in the crank shaft,
the first eccentric hole running from a first end face of the crank shaft to a center position of the crank shaft in the axial direction, and being disposed in a manner offset in a same direction as that of the first cylindrical cam, and
the second eccentric hole running from a second end face of the crank shaft to the center position of the crank shaft in the axial direction, and being disposed in a manner offset in a same direction as that of the second cylindrical cam.

2. The eccentric rocking type reduction gear according to claim 1, wherein axial-end balance adjusting portions which adjust a weight balance are provided at both ends of the crank shaft.

3. The eccentric rocking type reduction gear according to claim 2, wherein the axial-end balance adjusting portions are provided at both end faces of the crank shaft, and are chamfers provided at respective circumference edges of openings of the first and second eccentric holes.

4. The eccentric rocking type reduction gear according to claim 2, wherein the axial-end balance adjusting portions are balancer weights provided at both ends of the crank shaft, respectively.

5. An eccentric rocking type reduction gear comprising:
an internal gear;
two external gears meshed with the internal gear;
a hollow crank shaft supporting both of the external gears; and
a rotating carrier rotating together with a rotation of both of the external gears,
the crank shaft comprising first and second cylindrical cams disposed around an axial line of the crank shaft with respective phases being shifted by 180 degrees and in a manner offset from a rotation center of the crank shaft,
both of the external gears being supported by the first and second cylindrical cams, respectively, in a freely rotatable manner and in a manner revolvable around an axial line of the internal gear,
the carrier comprising a plurality of output pins fastened around an axial line of the carrier at an equal interval,
each of the output pins being engaged with a plurality of through-holes provided in both of the external gears to be linked with a rotation movement of both of the external gears, the crank shaft being rotated as an input shaft and either one of the internal gear and the carrier being rotated as an output shaft, two recesses being provided in an inner periphery of the crank shaft, and the respective recesses being disposed at opposite sides along offset directions of the first and second cylindrical cams, and being disposed at different positions along an axial direction of the crank shaft.

6. The eccentric rocking type reduction gear according to claim 3, wherein the axial-end balance adjusting portions are balancer weights provided at both ends of the crank shaft, respectively.

* * * * *